United States Patent [19]

Ikeda

[11] 3,929,093

[45] Dec. 30, 1975

[54] CHANNEL INDICATING DEVICE FOR TELEVISION RECEIVING SETS

[75] Inventor: Hisao Ikeda, Fujisawa, Japan

[73] Assignee: Matsushita Electric Industrial Co., Ltd., Osaka, Japan

[22] Filed: Jan. 9, 1973

[21] Appl. No.: 322,180

[30] Foreign Application Priority Data

Jan. 14, 1972 Japan .................................. 47-6332

[52] U.S. Cl. .......... 116/124.2 R; 74/10.41; 325/464; 334/86

[51] Int. Cl.² ............................................ H03J 1/02

[58] Field of Search... 116/124.1 R, 124.2 R, 124.3, 116/124.4; 334/86, 87; 325/455, 464, 465; 74/10.41, 10.54, 10.8

[56] References Cited

UNITED STATES PATENTS

| | | | |
|---|---|---|---|
| 2,839,936 | 6/1958 | Dawson | 74/10.8 X |
| 3,316,770 | 5/1967 | Badger et al. | 74/10.8 |
| 3,857,360 | 12/1974 | Tonari et al. | 116/124.2 R |

*Primary Examiner*—Richard C. Queisser
*Assistant Examiner*—Daniel M. Yasich
*Attorney, Agent, or Firm*—Stevens, Davis, Miller & Mosher

[57] ABSTRACT

A channel indicating device for television receiving sets, which is capable of indicating UHF channels one at a time interlocked with a rotary shaft of a detent-type tuner for selecting UHF stations.

6 Claims, 8 Drawing Figures

CHANNEL INDICATING DEVICE FOR TELEVISION RECEIVING SETS

This invention relates to a channel indicating device for television receiving sets.

In conventional television receiving sets, the channel indicating devices for VHF broadcasting have been so designed that the channel numbers of VHF stations are indicated individually one at a time. However, the channel indicating devices for UHF broadcasting have had the disadvantage that providing a clear indication of the channel of each UHF station has been impossible and the channel indicating operation has required skill, because the channel band is wide and the devices are of a sliding type. If an attempt is made to indicate the channels by use of a single circular indicating plate having the channel numbers denoted along the peripheral edge portion thereof, the channel indicating device will inevitably become too large to be incorporated in television receiving sets, particularly in small-sized television receiving sets.

The present invention contemplates the elimination of such a disadvantage and has for its object the provision of a channel indicating device which is capable of indicating the channels of UHF stations distinctly and individually.

Another object of the invention is to provide a channel indicating device of the character described, which is compact and small in size.

Now, a preferred embodiment of the invention will be described with reference to the accompanying drawings, in which.

Figure 6:
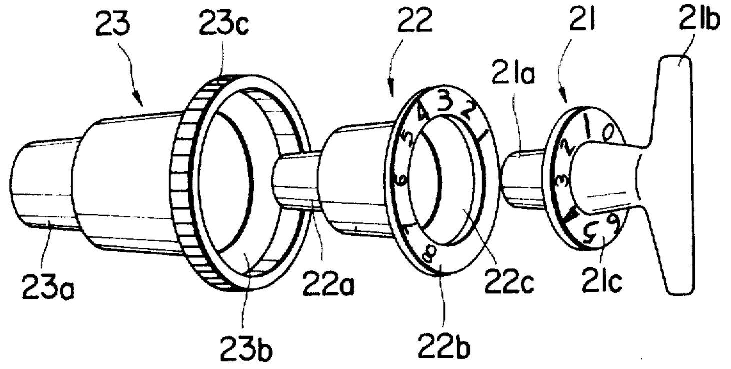
FIG. 6 is an exploded perspective view of another form of the knob unit.
Figure 7A:
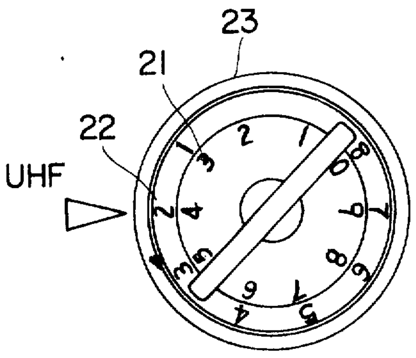
Figure 7B:
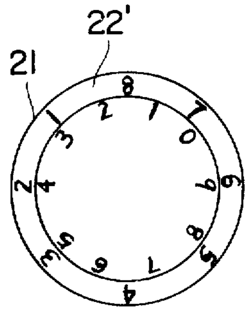

FIG. 7*a* is an elevational front view of the knob unit of FIG. 6 as completely assembled, illustrating the manner of indicating a channel; and FIG. 7*b* is an elevational front view illustrating another way of indicating a channel.

Figure 1:
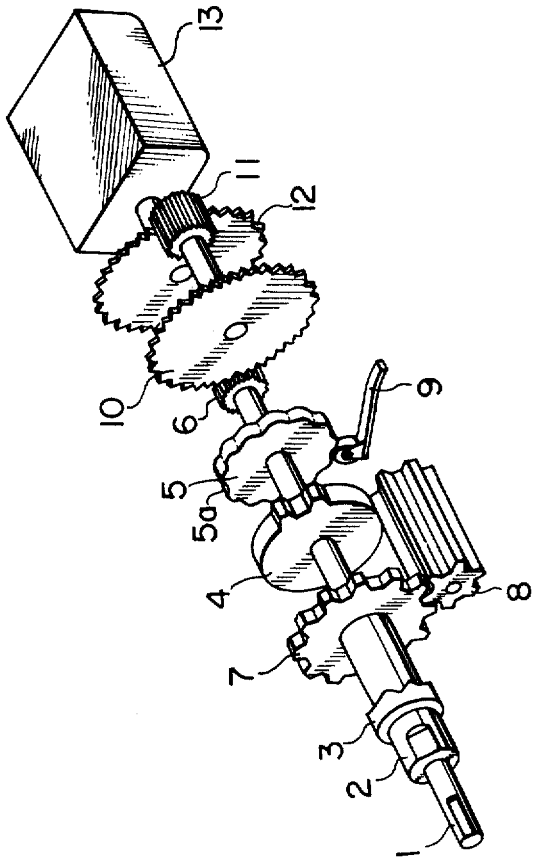
FIG. 1 is a perspective view showing the construction of a main tuning mechanism of one embodiment of the channel indicating device according to the invention.
Figure 2:
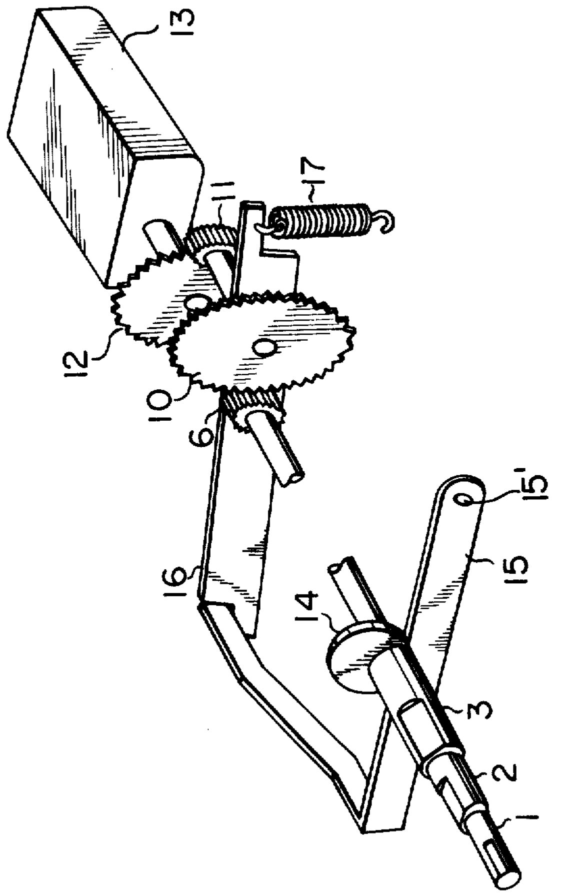
FIG. 2 is a perspective view showing the construction of a fine adjustment mechanism of the channel indicating device.

FIGS. 1 and 2 respectively show the tuning mechanism and fine adjustment mechanism of a channel indicating device according to the invention. In FIG. 1, the tuning mechanism includes a main shaft 1, an indicator shaft 2 and a fine adjustment shaft 3 rotatably mounted on the indicator shaft 2. Here, an arrangement is made such that the indicator shaft 2 will make intermittently a rotary motion step by step on every full revolution of the main shaft 1. On the main shaft 1 are fixedly mounted an intermittent gear 4, a separating disc 5 and a drive gear 6 in the order mentioned. The indicator shaft 2 has an indicator gear 7 fixedly mounted thereon. The intermittent gear 4 has two teeth for engagement with an intermittent pinion 8 which is in engagement with the indicator gear 7. The rotation of the intermittent gear 4 is transmitted to the intermittent pinion 8 not continuously. Namely, the intermittent pinion 8 is rotated by two teeth on every full rotation of the intermittent gear 4 mounted on the main shaft 1 and its rotation is transmitted through the indicator gear 7 to the indicator shaft 2 to rotate the same. The separating disc 5 has ten circumferentially equally spaced notches 5*a* formed along its peripheral edge. A press roller or detent 9 is in engagement with the notch 5*a* to ensure a click-motion of the main shaft 1. Gears 10, 11, 12 constitute a speed reduction mechanism for reducing the speed of rotation of the main shaft 1, and also constitute a planetary gear mechanism together with the gear 6. Describing in detail the engagement of these gears, the gear 10 is engaging with the drive gear 6 and the gear 12 with the gear 11 which is connected integrally with the gear 10. A shaft supporting the gear 12 is connected to a tuner 13. Thus, it will be understood that the angular displacement of a variable condenser of the tuner 13 is not more than the half of its circumference for several rotations of the main shaft 1.

As stated, the indicator gear 7 is rotated a pitch just equal to the two teeth of the intermittent gear 4 through the intermittent pinion 8 on every full rotation of the intermittent gear 4. It will be understood that, by properly selecting the gear ratio between the indicator gear 7 and the intermittent pinion 8, it is possible to rotate the indicator shaft 2 one tenth of its full rotation or at any other rate on every full rotation of the main shaft 1. Therefore, when the main shaft 1 is rotated in a click fashion by the separating disc 5 and press roller 9, its rotation is transmitted through the gear 6, the gear 10, the gear 11 and the gear 12 to the tuner 13 to operate the same, and concurrently through the intermittent gear 4 and the intermittent pinion 8 to the indicator gear 7 to cause a small angular displacement of said gear 7 which in turn causes a small angular displacement of the indicator shaft 2. A channel indicating mechanism including the shafts 1, 2 will be described later with reference to FIGS. 4, 5, 6 and 7.

The fine adjustment mechanism will now be described with reference to FIG. 2. In FIG. 2, reference numerals 1, 2 and 3 respectively designate the main shaft, the indicator shaft and the fine adjustment shaft shown in FIG. 1. The fine adjustment mechanism comprises a cam 14 fixedly mounted on the fine adjustment shaft 3, a lever 15 held in pressure contact with said cam 14, a gear arm 16 supporting the gears 10, 11 and a coil spring 17 anchored to one end of said gear cam 16, by which said gear arm is constantly urged to rotate in one direction. One end of the lever 15 is held in pressure contact with the other end of the gear arm 16 opposite to the end to which the coil spring 17 is anchored and the other end of lever 15 is pivotally secured to a fixed frame (not shown) at 15'.

Figure 3:
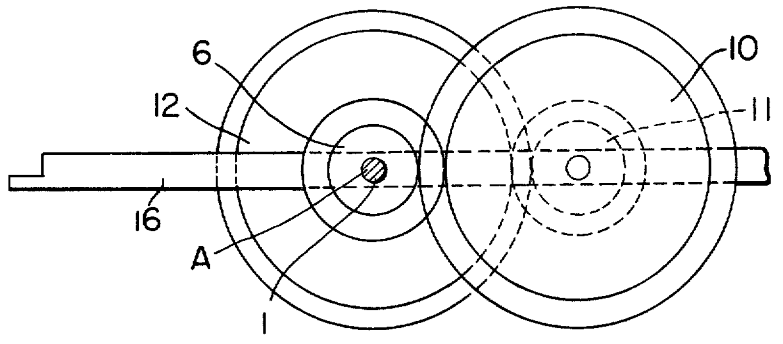
FIG. 3 is a substantially elevational front view of the fine adjustment mechanism shown in FIG. 2.

With the construction described above, when the fine adjustment shaft 3 is rotated, the cam 14 rotates causing a pivotal motion of the lever 15. The pivotal motion of the lever 15 causes the gear arm 16 to make a pivotal movement to operate the planetary gear mechanism in the manner to be described hereunder. FIG. 3 is a diagram for illustrating the operation of the planetary gear mechanism. Namely, the pivotal movement of the gear arm 16 causes the gear 10 to rotate bodily on the drive gear 6 about a point A on the apis of shaft 1 where said gear arm 16 is supported. The gear 11 connected integrally with the gear 10 rotates incident to the rotation of the said gear 10, causing a slight rotation of the gear 12. Thus, the tuner 13 is operated. The drive gear 6 does not rotate in this case, since the main shaft 1 is held against rotation by the engagement between the separating disc 5 and press roller 9. With *a* representing the number of teeth of the drive gear 6, *b* the number of teeth of the gear 10, *c* the number of teeth of the gear 11, *d* the number of teeth of the gear 12 and *n* the angular displacement of the gear arm 16, the angular displacement N of the gear 12 is expressed by the following formula:

$$N = (1 - ac/bd)n$$

In practice, the angular displacement of the gear arm 16 caused by the full revolution of the cam 14 is about one fortieth of its full revolution and the angular displacement of the variable condenser of the tuner 13 is also very small, so that fine adjustment within about two channels becomes possible. It will be understood that the range of fine adjustment can be properly adjusted by changing the shape of the cam 14.

Figure 4:
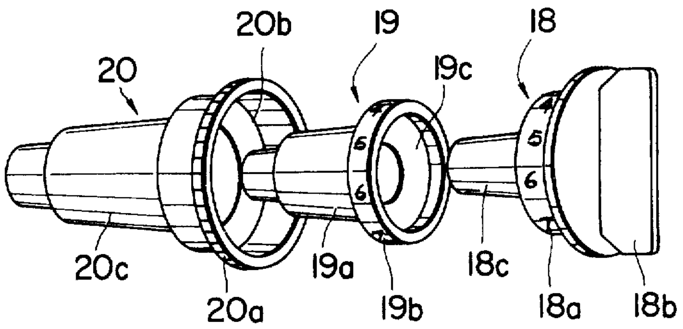
FIG. 4 is an exploded perspective view showing one form of a knob unit of the channel indicating device.
Figure 5:
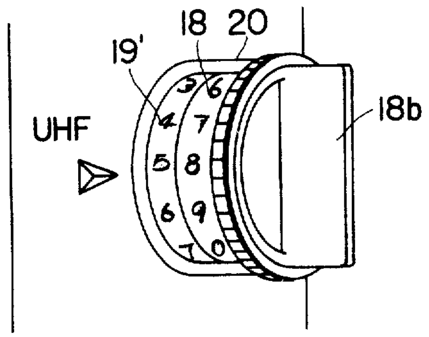
FIG. 5 is a perspective view of the knob unit of FIG. 4 as completely assembled.

FIG. 4 shows one form of a channel indicating knob unit provided on the side wall of the cabinet of a television receiving set. This channel indicating knob unit is composed of a knob element 18, another knob element 19 and a fine adjustment knob element 20. The knob element 18 is to be mounted on the main shaft 1 and has a channel indicating portion 18*a* bearing on the outer peripheral surface thereof numbers of one figure to indicate the numbers at the unit's place of channel numbers, a knob portion 18*a* and a mounting portion 18*c*. The other knob element 19 is to be mounted on the indicator shaft 2 and has a mounting portion 19*a*, a channel indicating portion 19*b* bearing on the outer peripheral surface thereof numbers of one figure to indicate the numbers at the tens place of channel numbers and a holding portion 19*c* for holding the mounting portion 18*c* of the knob element 18. The fine adjustment knob element 20 is to be mounted on the fine adjustment shaft 3 and is transparent in its entirety. This fine adjustment knob element 20 has a knob portion 20*a*, a holding portion 20*b* for holding the knob elements 18, 19 and a mounting portion 20*c*. Ten numbers from 0 to 9 are marked on the indicating portion 18*a* of the knob element 18 in peripherally equally spaced relation and eight numbers from 1 to 8 are marked on the indicating portion 19*b* of the knob element 19 in peripherally equally spaced relation. Incidently, six numbers suffice the need for indicating channel numbers in Japan. When these elements are mounted on the respective shafts at the mounting portions 18*c*, 19*a* and 20*c* respectively, the knob elements 18 and 19 are telescoped into the holding portion 20*b* of the fine adjustment knob element 20, with their channel indicating portions 18*a* and 19*b* adjoining each other. By turning the knob element 18 by one revolution, the knob element 19 is turned relative to the knob element 18, with a pitch just equal to the pitch of the numbers. Namely, a channel number is indicated by the combination of the numbers on the knob elements 18 and 19, located at an arrow marking. FIG. 5 shows a perspective view of the channel indicating knob unit as completely assembled.

FIG. 6 shows another form of a channel indicating knob unit which is adapted to be provided on the front wall of the cabinet of a television receiving set. This channel indicating knob unit comprises a knob element 21 to be mounted on the main shaft 1, another knob element 22 to be mounted on the indicator shaft 2 and a fine adjustment knob element 23 to be mounted on the fine adjustment shaft 3. The knob element 21 has a mounting portion 21*a*, a knob portion 21*b* and a channel number indicating disc 21*c*. The other knob element 22 has a mounting portion 22*a*, a channel number indicating portion 22*b* consisting of an annular flange, and a holding portion 22*c* for holding the channel indicating disc 21*c* of the knob element 21. The fine adjustment knob element 23 has a mounting portion 23*a*, a holding portion 23*b* for holding the knob element 22 and a knob portion 23*c*. Similar to the preceding form of the knob unit, ten numbers from 0 to 9 are marked on the channel indicating disc 21*c* of the knob element 21 at an equal circumferential interval, and eight numbers from 1 to 8 are marked on the channel indicating portion 22*b* of the knob element 22. In Japan, six numbers from 1 to 6 need to be marked on the knob element 22 since the channel numbers of UHF stations are less than 70. When these knob elements are mounted on the respective shafts, the knob element 21 is telescoped into the knob element 22 and the knob element 22 into the fine adjustment knob 23, whereby the channel indicating knob unit is completed, the front elevational view of which is shown in FIG. 7*a* or 7*b*. FIG. 7*a* shows the case in which the interval of the channel indicating numbers of the knob element 21 is the same as that of the channel indicating number of the knob element 22. FIG. 7*b* shows the case in which the channel indicating numbers on the knob elements 21 and 22 are arranged on the channel indicating portions thereof, respectively in equally spaced relation but at different intervals. In this case, also, similar to the preceding form of the knob unit, the knob element 22 turns with a pitch just equal to the interval of the channel indicating numbers, relative to the knob element 21 when said knob element 21 is turned by one revolution, and the channel number of each UHF station is indicated by the combination of the numbers on the respective knob elements, located at the arrow marking. The type of knob unit shown in FIG. 7*b* will be more effective than the type shown in FIG. 7*a*, for indicating distinctly only the channel number.

The channel indicating device according to the invention, described and illustrated herein, is advantageous in that, since it is of a detent-type similaar to the channel indicating device for VHF channels, its channel indicating effect is positive and channel selecting operation is easy. Further, the channel indicating device of the invention is small in size and yet is singly capable of indicating a large number of UHF channels, and hence is adapted for practical use. It is to be noted that according to the invention, the channel indicating portion need not be provided inside the cabinet of a television receiving set but the channel indicating numbers are simply marked on the knob unit proper, so that the indication of channel numbers becomes very simple.

It is also to be noted that, in the event the tuner 13 shown in FIGS. 1 and 2 is of a type capable of receiving broadcasts from not only UHF stations but also VHF stations, the selection of both VHF and UHF channels is possible by the same and single knob and the selected channel can be indicated by number.

What is claimed is:

1. A channel indicating device for television receiving sets, comprising:

a. a tuner having a tuner shaft projecting therefrom and a first gear affixed to said tuner shaft;

b. a main shaft having a second gear affixed thereto;

c. a fine adjustment shaft rotatably coaxially mounted on said main shaft and having a cam affixed thereto;
d. third and fourth gears coaxially mounted on a connecting shaft, said third and fourth gears having being rotatably coupled to said second and first gears respectively;
e. an arm secured to said connecting shaft and pivotally mounted about the axis of said main shaft;
f. resilient means for biasing one end of said arm in a predetermined direction;
g. lever means contacting said cam and held in abutting engagement with the other end of said arm, rotation of said fine adjustment shaft producing a relatively small displacement of said tuner shaft thereby permitting fine adjustment of said tuner,
h. an indicator shaft rotatably mounted on said main shaft and having an indicator gear affixed thereto, said indicator shaft being coaxial with said main shaft and said fine adjustment shaft;
i. an intermittent gear affixed to said main shaft; and
j. an intermittent pinion coupling said indicator gear and intermittent gear, the gear ratio between said indicator gear and said intermittent pinion being selected to provide a desired angular rotation of said indicator shaft for a given angular rotation of said main shaft.

2. A channel indicating device as defined by claim 1 which further comprises a separating disc fixedly mounted on said main shaft; and detent means engaging said separating disc, said detent means and separating disc holding said main shaft in a position to which the main shaft has been displaced and permitting displacement therefrom upon rotation of said main shaft.

3. A channel indicating device as defined by claim 1 which further comprises a channel indicating knob unit, said indicating knob unit comprising a fine adjustment knob element secured to said fine adjustment shaft, a first knob element secured to said indicator shaft and a second knob element secured to said main shaft, said first and second knob elements having numerals thereon indicating the numerals in the tens and units places respectively of the channel numbers, said fine adjustment knob element and said second knob element being provided with knob portions for manual rotation of said fine adjustment shaft and main shaft respectively, rotation of said second knob element producing intermittent rotation of said first knob element to display a selected channel number.

4. A channel indicating device as defined by claim 3 wherein said first and second knob elements have annular flanges extending radially from the axes of said knob elements, the numerals on said knob elements being located on said annular flanges to permit viewing thereof from a direction corresponding to the axes of said knob elements.

5. A channel indicating device as defined by claim 3 wherein said fine adjustment knob element is provided with a transparent cylindrical portion, and said first and second knob elements are telescoped into said cylindrical portion, the knob portion of said fine adjustment knob element extending outwardly through an opening in said cylindrical portion.

6. A channel indicating device as defined by claim 3 wherein said first and second knob elements have respective indicating portions parallel to the axes of said knob element, the numerals in said knob elements being located on said respective indicating portions to permit viewing thereof through the transparent cylindrical portion of said fine adjustment knob element when said first and second knob elements have been telescoped into said cylindrical portion.

* * * * *